United States Patent [19]

Heredy et al.

[11] 4,228,224
[45] Oct. 14, 1980

[54] POSITIVE ELECTRODE FOR ELECTRICAL ENERGY STORAGE DEVICE

[75] Inventors: Laszlo A. Heredy, Canoga Park; Lowell R. McCoy, Woodland Hills, both of Calif.

[73] Assignee: Rockwell International Corporation, El Segundo, Calif.

[21] Appl. No.: 29,592

[22] Filed: Apr. 12, 1979

[51] Int. Cl.$^2$ .............................................. H01M 6/20
[52] U.S. Cl. ..................................... 429/112; 429/163
[58] Field of Search ..................... 429/112; 148/6.15 R

[56] References Cited

U.S. PATENT DOCUMENTS

| | | | |
|---|---|---|---|
| 3,887,732 | 6/1975 | Parker et al. | 148/6.15 R |
| 3,898,096 | 8/1975 | Heredy et al. | 429/112 |
| 3,992,222 | 11/1976 | Walsh et al. | 429/112 |
| 4,063,968 | 12/1977 | Matsushima et al. | 148/6.15 R |
| 4,076,905 | 2/1978 | Sammells | 429/112 |
| 4,143,213 | 3/1979 | Jacobson et al. | 429/112 |

Primary Examiner—Donald L. Walton
Attorney, Agent, or Firm—L. Lee Humphries; Henry Kolin; Clark E. DeLarvin

[57] ABSTRACT

The rechargeable electrical energy storage device including spaced-apart negative electrode and positive electrode structures immersed in an electrolyte which is molten at the operating temperature of the device wherein the positive electrode structure comprises a housing for containing a body of electropositive active material, said housing having at least one open face, an electrolyte permeable member affixed to the housing and covering said open face for retaining said active material in said housing and said housing and electrolyte permeable member comprising material selected from the group consisting of steel, nickel, copper and alloys thereof having at least an 8 μm thick electroless nickel coating thereon. In accordance with the present invention it has been found that such an electroless nickel coating permits the use of relatively inexpensive conductive materials such as steel, nickel, copper and alloys thereof and provides the corrosion resistance required in the molten electrolyte. The present invention is particularly applicable to electrical energy storage devices which utilize a transition metal chalcogenide as a positive electrode active material and a lithium alloy as the negative electrode active material.

15 Claims, 2 Drawing Figures

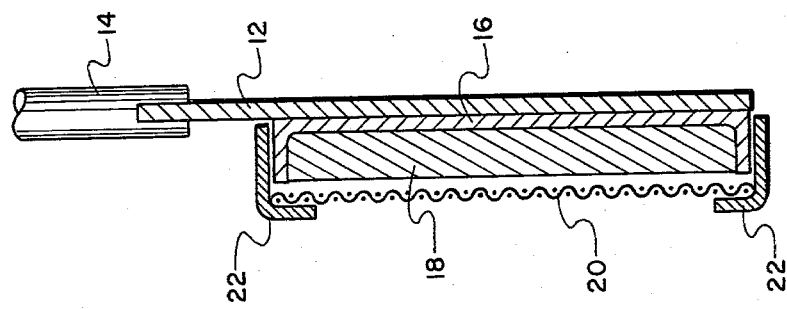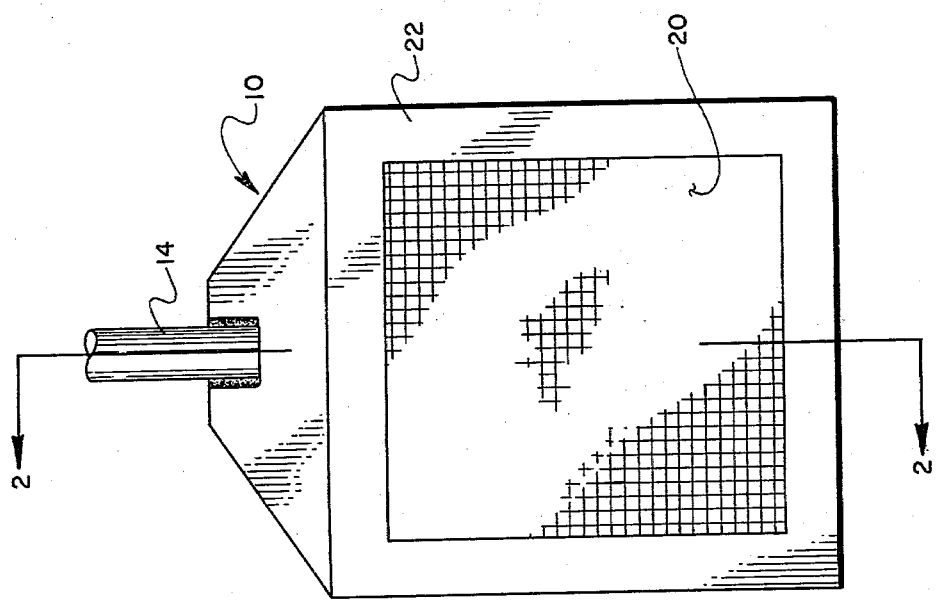

POSITIVE ELECTRODE FOR ELECTRICAL ENERGY STORAGE DEVICE

BACKGROUND OF THE INVENTION

1. Field of the Invention

This invention relates to a high-temperature electrically regenerable electrochemical system. It patricularly relates to a lithium alloy-molten salt-transition metal chalcogenide secondary cell or battery providing long cycle life and high energy density. It specifically relates to a positive electrode structure for use in such devices.

2. Prior Art

High energy density batteries are of particular interest for application as a source of power for an electric vehicle and for load leveling in the electric utility industry. Initially, the interest was directed toward the lithiumsulfur cell using a molten halide; see M. L. Kyle et al, "Lithium/Sulfur Batteries for Electric Vehicle Propulsion", *Sixth Intersociety Energy Conversion Engineering Conference Proceedings*, p. 38 (1971); and L. A. Heredy et al, *Proc. Intern. Electric Vehicle Symp., Electric Vehicle Council* 1, 375 (1969). Such lithium-molten salt batteries using sulfur positive electrodes when fully developed could provide an energy density of greater than 100 watt-hr/lb. Were a cycle life of 2500 cycles and an operating life of 10 years attainable with these batteries, they could satisfy all the requirements of electric power peaking, which is of great interest to the electric utility industry for providing off-peak energy storage and load leveling.

It has been found, however, that long cycle life is difficult to attain with such high-temperature molten salt batteries containing a sulfur electrode because of the gradual loss of the active sulfur material from the positive electrode compartment at these elevated temperatures. Sulfur loss generally occurs by vaporization of the sulfur or by dissolution of intermediate discharge products (polysulfide ions) in the molten salt electrolyte followed by diffusion from the positive electrode compartment through the bulk of the electrolyte to the negative lithium electrode.

To eliminate some of these problems, it has been proposed (U.S. Pat. No. 3,898,096, assigned to the assignee of the present invention) to use certain selected transition metal chalcogenides as positive electrode material in lieu of elemental sulfur. The preferred positive electrode materials are copper sulfide, iron sulfide, nickel sulfide, and nickel oxide. The patent teaches that the positive electrode materials, which are in solid form at the operating temperature of the molten salt electrolyte battery, must be made readily available in a finely divided form presenting a high specific surface.

Two approaches generally have been followed in the construction of a negative lithium electrode for use in an electrical energy storage device, such as a rechargeable battery, particularly one employing a molten salt electrolyte. In one approach, the lithium is alloyed with another metal such as, for example, aluminum to form a solid electrode at the operating temperature of the cell. In the other approach, liquid lithium is retained in a foraminous metal substrate by capillary action. Heretofore, the latter approach has been preferred because it offers higher operating cell voltages and therefore potentially higher battery energy densities. Certain problems are encountered, however, when it is attempted to retain molten lithium in a foraminous metal substrate. More particularly, most metals which are readily wetted by lithium are too soluble in the lithium to permit their use as the metal substrate, whereas most metals structurally resistant to attack by molten lithium are poorly wetted by the lithium when placed in a molten salt electrolyte.

Various other materials have been suggested for use as an alloy with lithium to form a solid electrode. In U.S. Pat. No. 3,506,490, for example, it is suggested that the lithium be alloyed with either aluminum, indium, tin, lead, silver or copper. However, none of these materials have been proven to be completely satisfactory. More particularly, these other suggested materials, such as tin and lead for example, form alloys containing lesser amounts of lithium than does aluminum, and thus have a still lower capacity (ampere-hours) per unit weight of alloy. Further, the potential of these other alloys compared with liquid lithium is more positive than that of a lithium-aluminum alloy; thus, alloys of such other materials are less desirable. Other patents relating to solid lithium anodes include U.S. Pat. Nos. 3,506,492 and 3,508,967.

More recently, in U.S. Pat. No. 3,969,139, assigned to the assignee of the present invention, there has been suggested an improved lithium electrode and an electrical energy storage device such as a secondary battery or rechargeable electrochemical cell utilizing such electrode. The improved electrode comprises an alloy containing lithium and silicon in intimate contact with a supporting current-collecting matrix. The lithium is present in the alloy in an amount from about 28 to 80 wt.%.

Various materials have been suggested for use as current collecting structures for electrodes in lithium-metal sulfide batteries. The particular material selected must of course be resistant to the corrosive environment at the various operating temperatures and electrical potentials. This is particularly true of the positive electrode structure. Molybdenum is particularly well suited for the component as it is highly conductive to electricity and reliably resists corrosion. However, it is prohibitively expensive and difficult to fabricate. Nickel, steel, copper and alloys thereof also have been suggested for use in such devices. However, it now has been found that these materials, while having a desired high electrical conductivity, are incapable of withstanding the corrosive environment encountered by the positive electrode for extended periods of time.

Copper and steel are quite rapidly attacked while it has been found that with continued cycling of the device, nickel appears to undergo some form of intergranular corrosion which renders it unsuitable for use where long life is necessary. Obviously, there is need for a suitable material for use as a positive electrode structure for use in such devices. Ideally, such material would be inexpensive, corrosion-resistant and have a low electrical resistivity.

SUMMARY OF THE INVENTION

The present invention provides a positive electrode structure for use in a lithium-molten salt-metal sulfide secondary battery or regenerable electrical energy storage device which is inexpensive, corrosion-resistant and has a low electrical resistivity. Broadly, the electropositive electrode structure of the present invention comprises a housing for containing a body of electropositive active material, said housing having at least one open face and an electrolyte permeable member affixed to said housing and covering said open face retaining said active material therein. A housing and electrolyte permeable member are formed from a material selected from the group consisting of steel, nickel, copper and alloys thereof. These materials are relatively inexpensive and have a desired low resistivity. Corrosion resistance is imparted to the material by coating the housing and electrolyte permeable member with at least 8 μm (about 0.3/1000ths of an inch) of electroless nickel, preferably the electroless nickel coating has a thickness of from about 0.5 to 1.0/1000ths of an inch. The present invention is particularly applicable to rechargeable electrical energy storage devices which utilize a solid lithium alloy for the negative electrode material, a transition metal chalcogenide as the positive electrode active material and an electrolyte comprising at least one lithium halide which is molten at the operating temperature of the device.

BRIEF DESCRIPTION OF THE DRAWINGS

FIG. 1 is a front elevation view of a positive electrode structure built in accordance with the present invention; and FIG. 2 is a sectional view of the positive electrode structure taken along the line 2—2 of FIG. 1.

DESCRIPTION OF THE PREFERRED EMBODIMENTS

The present invention is particularly applicable to the so-called high energy density batteries. It will be specifically described with respect to those batteries which utilize an alkali metal alloy as the electronegative active material and a transition metal chalcogenide as the electropositive active material, both of which are in contact with a molten salt electrolyte, i.e., one of which is molten at the operating temperature of the battery. The electronegative active material may be an alloy of any alkali metal, such as lithium, sodium, potassium, cesium, or rubidium. However, for convenience, the following description will be directed to the particularly preferred alkali metal, namely, lithium. Further, it will be appreciated that the alkali metal may be alloyed with any other metal, provided that the alloy is a solid at the operating temperature of the electrical energy storage device. The selection of the alloy, or alloy constituent, will of course have a significant bearing upon the voltage potential with respect to any given positive electrode material, and further, will have an equally significant effect upon the amount of active material which may be present in the alloy. For example, lithium may be alloyed with either aluminum, indium, tin, lead, silver, or copper. However, the particularly preferred alkali metal alloys include a mixture of lithium and silicon in which the lithium is present in an amount up to about 55% by weight when the electrode is in its fully charged state, or a mixture of lithium and aluminum in which the lithium is present in an amount up to about 20% by weight in the fully charged state. Such alloys may also contain other materials such as boron, iron, or combinations thereof to reduce the tendency of the alloying element to migrate into the supporting structure.

The term "transition metal chalcogenide" as herein defined refers to the chalcogenides of those transition elements of the first series of the Periodic Table beginning with vanadium (atomic number 23) and concluding with zinc (atomic number 30), and further including molybdenum (atomic number 42) from the second series of transition elements. While scandium and titanium are ordinarily classified as transition elements based on their atomic structure, they show a general lack of resemblance in their chemical behavior to the other transition elements. Scandium sulfides have not been shown to be usable in molten electrolyte cells. Titanium and vanadium disulfide, unlike the other transition metal sulfides have been shown to form intercalation compounds, e.g., $TiLiS_2$. While most of the work done with this latter class of material has been done in ambient temperature cells using organic electrolytes, limited experimental work suggests that they may also be usable in molten electrolyte cells. Because of the close similarity in behavior between chromium and molybdenum, the chalcogenides of the latter element are considered usable for the present invention. Thus, the chalcogenides of the first series of transition metals beginning with vanadium and concluding with zinc, with the further addition of molybdenum, are defined herein as those chalcogenides of specific interest and utility in the practice of the present invention. The preferred transition metal chalcogenides in the practice of the present invention are the chalcogenides of iron and nickel. Particularly preferred positive electrode materials include iron sulfide, nickel sulfide, and nickel oxide.

The term "molten salt electrolyte" as used herein is exemplified by a lithium halide-containing salt which is maintained at a temperature above its melting point during operation of the electrical energy storage device. The molten salt may be either a single lithium halide, a mixture of lithium halides, or a eutectic mixture of one or more lithium halides and other alkali metal or alkaline earth metal halides.

Typical examples of binary salt mixtures are lithium chloride-potassium chloride, lithium bromide-potassium bromide, lithium fluoride-rubidium fluoride, lithium iodide-potassium iodide, and mixtures thereof. A preferred binary salt eutectic mixture is that of lithium chloride and potassium chloride (melting point 352° C.). Non-eutectic mixtures of these salts have also been found to be suitable.

Although some ternary eutectic salt mixtures, particularly those containing the iodides, provide lower melting points, the binary mixture of lithium chloride-potassium chloride is preferred on the basis of its lower cost and availability, particularly for batteries to be used in large scale applications, such as electric powered vehicles and electric utility bulk storage.

Referring now to FIGS. 1 and 2, therein is depicted a positive electrode structure 10 constructed in accordance with the present invention. The electrode structure comprises a current collecting conductor 12 having affixed to a top end thereof a terminal post 14. Attached to current collector 12 is a housing 16 for retaining a body of active positive material 18 such as, for example, particulate iron sulfide. Housing 16 may be attached to current collector 12 in any desired manner, such as by threaded fasteners, spot welding, brazing, or the like. The body of active positive material 18 is retained in place by a permeable member which may be, for example, a screen 20 having a mesh size sufficiently fine to retain the particles and still permit the free flow of ions therethrough. Screen 20 is retained in place by securing it to housing 16, for example, by a retainer frame 22 which in a preferred embodiment is formed to be a press fit over housing 16. Obviously, of course, retainer frame 22 also can be fastened by brazing, spot welding, threaded fasteners, or the like. Optionally, there also may be provided, intermediate to screen 20 and the are set forth in said latter reference (page 491) and reproduced in the table below.

| Components | ELECTROLESS NICKEL BATH COMPOSITIONS | | | | | |
|---|---|---|---|---|---|---|
| | A | B | C | D | E | F |
| Nickel Chloride, oz/gal | 4.0 | 6.0 | | | | 2.54 |
| Nickel Sulfate, oz/gal | | | 10.7 | 2.80 | 2.8 | |
| Sodium Compounds, oz/gal | | | | | | |
| Hypophosphite | 1.33 | 1.47 | 3.2 | 3.20 | 3.2 | 3.20 |
| Hydroxy Acetate | 1.33–6.67 | | | | | |
| Citrate | | 13.3 | | | | |
| Acetate | | | | 1.60 | | |
| Fluoride | | | | 0.29 | 0.33 | |
| Succinate | | | | | 2.13 | |
| Malate | | | | | | 3.47 |
| Amino-acetate | | | | | | 0.94 |
| Ammonium Chloride, oz/gal | | 6.67 | 0.8 | | | |
| Acids, oz/gal | | | | | | |
| Boric | | | 1.07 | | | |
| Latic, 80% | | | | 4.54 | 4.54 | |
| Propionic, fl oz/gal | | | | 0.28 | | |
| Lead, ppm | | | | 0.7–3 | 0.7–3 | 0.7–2 |
| Tellurium, ppm | | | | | | 1.0 |
| Conditions: | | | | | | |
| pH, Electrometric | 4–6 | 8.5–9.0 | 4.8–5.8 | 4.5–4.7 | 4.5–4.7 | 6.5–6.7 |
| Temperature, F. | 194 | 194–212 | 200 | 200 | 203 | 201 |
| Plating rate, mil/hr | 0.6 | 0.6 | 0.6–0.9 | 0.9–1.1 | 1.3–1.4 | 2.2 |
| Coating Appearance | Semi-bright | Bright | Semi-bright | Bright, Smooth | Bright, Smooth | Very Bright | body of positive active material 18, a particle barrier cloth fabricated from fibers of ceramic materials, as $ZrO_2$ or $Y_2O_3$.

In accordance with the present invention, it has been found it is now possible to use inexpensive highly conductive materials such as nickel, steel, copper and alloys thereof in an electrode structure for use in an electrical energy storage device such as a metal sulfide-molten salt lithium alloy secondary battery. It is an essential feature of the present invention that the aforementioned structural members excluding the active material and the optional particle barrier cloth, of course, be provided with a substantially uniform coating of electroless nickel having a thickness of at least about 0.3/1000ths of an inch.

It has been found that a coating thickness of less than about 0.3/1000ths of an inch does not adequately prevent corrosion of the base metal. Thus, a thickness of at least about 0.3/1000ths of an inch is considered to be critical to practice the present invention. The upper limit of thickness is limited only by practical or economic considerations. Accordingly, a thickness of from 0.5 to 1.0/1000ths of an inch is preferred and particularly good results are obtained with a thickness of from about 0.6 to 0.7/1000ths of an inch.

The electroless coating may be applied in any of numerous known ways using baths having various compositions. Exemplary patents relating to electroless nickel depositing are U.S. Pat. No. 2,532,284 (Brenner et al); U.S. Pat. No. 2,690,401, U.S. Pat. No. 2,658,841 and U.S. Pat. No. 2,935,425 (Guitzeit et al); U.S. Pat. Nos. 2,847,327 and 3,325,297 (Talmey et al) and U.S. Pat. No. 3,887,732 (Parker et al); the disclosures of said patents being incorporated herein by reference. An additional reference relating to the techniques employed in electroless nickel depositing is found in the *Electroplating Engineering Handbook*, Third Edition, of Van Nostrand Reinhold Company, the disclosure of which also is incorporated herein by reference. A representative variety of electroless nickel bath compositions While most of the foregoing baths relate principally to baths which deposit a nickel-phosphide coating, it also will be appreciated that other electroless nickel coatings would be expected to provide similar corrosion resistant properties in view of the excellent corrosion resistance which electroless nickel phosphide has been found to provide. Another typical electroless nickel coating, for example, would be a nickel boride coating.

The following example is set forth for the purpose of further illustrating the present invention. For convenience, the example relates to the use of a commercial electroless nickel phosphide coating process utilizing copper as the base metal for the material of construction. However, the invention should not be construed as being so limited, since as herein disclosed, it will have equal utility with respect to other coatings and other materials of construction.

EXAMPLE

Test electrodes were prepared from sheet copper, about 0.5 mm thick, fabricated to yield a vertical ribbed, open faced support for the active material measuring 5 cm×5 cm×0.48 cm deep. The distance between adjacent ribs was approximately 0.62 cm. A copper plate was brazed to the back of the ribbed support to provide a current conduction path. The face and bottom of the ribbed structure were covered with 80-mesh copper screen to provide containment of the active material within the ribbed structure and to permit ready access of electrolyte ions through the face of the electrode into the active material. The copper screen was joined to the back plate during the brazing operation and adhered to the ribs by diffusion bonding during the brazing operation.

One electrode was left in its original condition while the other was uniformly plated with electroless nickel in accordance with the directions of the manufacturer (Shipley Niposit 65) to provide a coating estimated to be at least 8 μm thick (0.0003 inches).

The eight vertical cavities in each electrode were then filled with a mixture of lithium sulfide ($Li_2S$) and iron powder in the correct stoichiometric ratio to yield ferrous sulfide (FeS) when fully charged. The unprotected copper electrode was filled with this active material to a theoretical capacity of 5.8 ah. The nickel plated electrode had a capacity of 6.3 ah. These electrodes were then placed in stainless steel cases together with negative electrodes of a similar size which were filled with iron silicide ($FeSi_2$) which is converted to a lithium silicon alloy when charged. Electrical insulation between the negative and positive electrodes was provided in each case by placing a layer or zirconia cloth over the positive electrode and by interposing a layer of aluminum nitride powder of 40 to 80 mesh particle size between the cloth and the negative electrode. This was done by placing thin, 1.5 mm strips of dense boron nitride between the vertical edges of the electrodes to provide a cavity of that thickness and extending over the faces of the electrodes into which the aluminum nitride powder was introduced. All electrodes were electrically insulated from the cell walls and bottom by high purity beryllium oxide plates, about 1.5 mm thick. Sheet metal "shims" were inserted into each cell to effect close contact between the functional components.

When assembly was completed, the cells were operated in small furnaces after the addition of a sufficient quantity of electrolyte to cover the electrodes. The electrolyte contained 50 wt.% each of lithium chloride and potassium chloride. After a short break-in period during which the cells were charged and discharged at 10 ma/cm$^2$, each cell was charged at 33 ma/cm$^2$ of electrode area and discharged at 67 ma/cm$^2$. The cells were then charged to an upper voltage of 1.75 to 1.8 volts; then discharged to $\sim$0.9 volts. This sequence was then repeated. The cell voltages and current were monitored by dual channel recorders. The cells were operated at about 450° C.

The cell containing the bare copper electrode showed early evidence of failure when the coulombic efficiency fell to 90% after 20 cycles and then to 88% in 37 cycles. When left at open circuit at this point the cell voltage dropped to zero in two days indicating a serious internal short. The operation of the cell was then terminated. Flakes of copper metal were observed on the surface of the electrolyte. When the cell was taken apart, copper deposits were found in the negative electrode, as a result of migration of copper dissolved from the positive electrode and transported ionically through the separator to the negative electrode when it was reduced to the metallic form. It has similarly been found that coating thicknesses of less than about 8 $\mu$m fail to give sufficient corrosion protection to prevent premature failure of the cell.

The cell assembled with the electroless nickel plated copper electrode continued to operte at high coulombic efficiency ($\geq$98%) for in excess of 300 cycles, indicating that copper migration, the cause of the short in the cell with the unprotected electrode, was not occurring in this cell.

The conditions, plating bath and base metals of the foregoing example are illustrative of one embodiment of the present invention. It is to be understood, however, that other baths, electroless nickel coatings and base metals also can be used. Thus, while the invention has been described with reference to what is now considered the best mode of practice, various changes and modifications will be apparent to those versed in the art without departing from the scope of the invention as set forth.

What is claimed is:

1. In a rechargeable electrical energy storage device including a lithium halide-containing salt electrolyte which is molten at the operating temperature of the device, and electropositive and electronegative electrode structures spaced apart in said electrolyte, the improvement wherein said electropositive electrode structure comprises:
   a housing for containing a body of electropositive active material, said housing having at least one open face;
   an electrolyte-permeable member affixed to said housing and covering said open face for retaining said active material in said housing; and
   said housing and electrolyte-permeable member comprising a material selected from the group consisting of steel, nickel, copper and alloys thereof having at least a 0.3/1000ths of an inch thick electroless nickel coating thereon, said electroless nickel coating being selected from the group consisting of nickel phosphide and nickel boride.

2. The electrical energy storage device of claim 1 wherein said electrochemically active material is a transition metal chalcogenide.

3. The electrical energy storage device of claim 1 wherein said electronegative electrode contains an alkali metal alloy for the electrochemically active material.

4. The electrical energy storage device of claim 3 wherein the alkali metal alloy comprises an alloy of lithium and silicon.

5. The electrical energy storage device of claim 4 wherein said nickel coating is from 0.5 to 1.0/1000ths of an inch thick.

6. The electrical energy storage device of claim 1 wherein said electroless nickel coating is a nickel phosphide coating.

7. The electrical energy storage device of claim 6 wherein said housing and said electrolyte-permeable members are steel.

8. The electrical energy storage device of claim 6 wherein said housing and electrolyte-permeable member are copper and provided with an electroless nickel phosphide coating in a thickness within the range of from 0.5 to 1.0/1000ths of an inch.

9. The electrical energy storage device of claim 1 wherein said electronegative electrode structure contains a lithium alloy as the active material and the electropositive electrode structure contains a transition metal chalcogenide as the active material.

10. The electrical energy storage device of claim 9 wherein the electropositive electrode structure comprises a metal selected from the group consisting of steel, nickel, copper and alloys thereof covered with a substantially uniform coating of electroless nickel and having a coating thickness within the range of from 0.5 to 1.0/1000ths of an inch.

11. The electrical energy storage device of claim 10 wherein said electroless nickel coating comprises nickel phosphide.

12. The electrical energy storage device of claim 11 wherein said transition metal chalcogenide is iron sulfide.

13. The electrical energy storage device of claim 12 wherein the lithium alloy comprises an alloy of lithium and silicon.

14. The electrical energy storage device of claim 13 wherein the lithium alloy comprises an alloy of lithium and aluminum.

15. The electrical energy storage device of claim 14 wherein the electroless nickel coating has a thickness within the range of from about 0.6 to 0.7/1000ths of an inch.

* * * * *